US005959956A

United States Patent [19]

Takishima

[11] Patent Number: 5,959,956

[45] Date of Patent: Sep. 28, 1999

[54] LOADING DRIVE MECHANISM FOR DISK DRIVE

[75] Inventor: Suguru Takishima, Tokyo, Japan

[73] Assignee: Asahi Kogaku Kogyo Kabushiki Kaisha, Tokyo, Japan

[21] Appl. No.: 08/664,003

[22] Filed: Jun. 14, 1996

[30] Foreign Application Priority Data

| | | | |
|---|---|---|---|
| Jun. 15, 1995 | [JP] | Japan | 7-172687 |
| Jun. 15, 1995 | [JP] | Japan | 7-172814 |
| Jun. 15, 1995 | [JP] | Japan | 7-172909 |
| Jun. 16, 1995 | [JP] | Japan | 7-174485 |

[51] Int. Cl.[6] .......... G11B 17/04; G11B 25/04

[52] U.S. Cl. .......... 369/75.2; 369/77.2; 360/99.07

[58] Field of Search .......... 369/75.1, 75.2, 369/77.1, 77.2; 360/99.02, 99.03, 99.06, 99.07; 74/409, 422, 440

[56] References Cited

FOREIGN PATENT DOCUMENTS

| | | |
|---|---|---|
| 56-169270 | 12/1981 | Japan . |
| 5-325202 | 12/1993 | Japan . |

*Primary Examiner*—David L. Ometz

*Attorney, Agent, or Firm*—Greenblum & Bernstein P.L.C.

[57] ABSTRACT

A drive unit including a motor, a reduction gear train, and a drive pinion drives a rack attached to a sliding member having cams formed therein. The cams move a cartridge holder to transport a disk to a loading position. One of the drive unit or a portion of the rack is movable to disengage the two. Variations include: a swingable drive unit for swinging the drive pinion away from the rack against the bias of a tension spring; a pivotable rack for pivoting the rack away from the drive pinion against the bias of a resilient cantilevered portion or a plate spring; and a rack having rack teeth mounted on resilient cantilevered portions movable away from the drive pinion against the bias of the resilient cantilevered portions.

27 Claims, 13 Drawing Sheets

8
82
84
88
86
D2
D1
81
81
72
73
73
75
73a
73b
73c
73
72
78
71
73
7
A1
A2
63
63
62
6
62
III
74
76
61
65
65
63b
63a
63
63
20
26
III
22
24
30
11

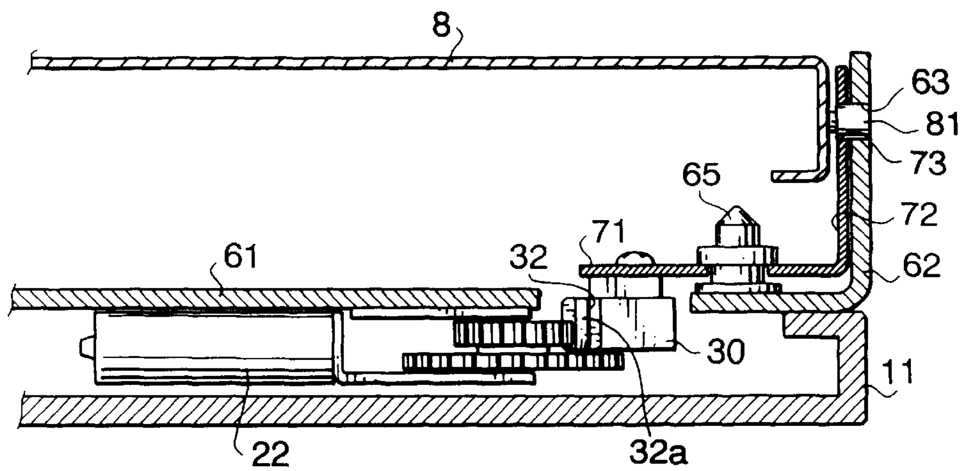
FIG. 3
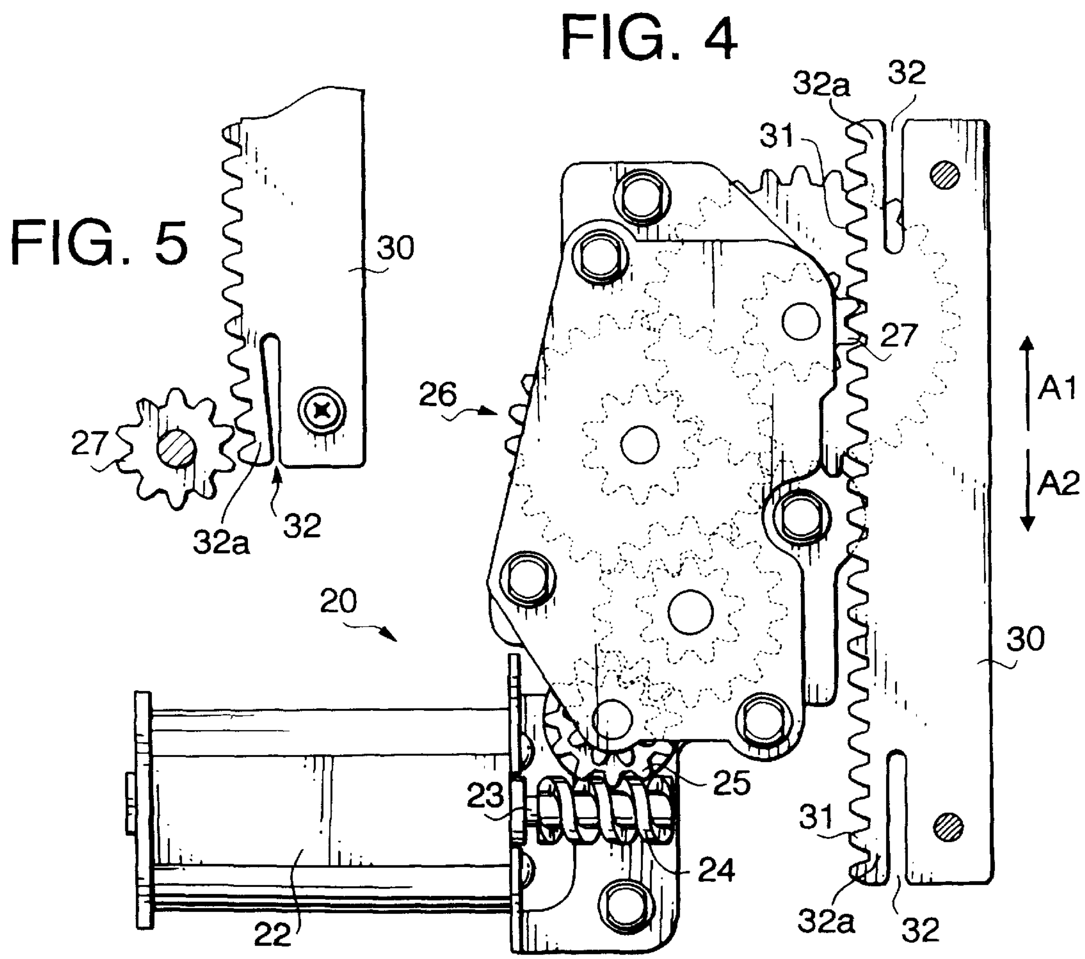
FIG. 4
FIG. 5

62
71
73
72
135
136
137
130
138
73
7
135
6
VIII
137
26
136
11
55
120
50
55
51
52
50
53
22
VIII 8
63
81
73
72
50
138
61
130
62
136
11
22
135

137
134
131
136
50
135
27
26
50
120
138
130
135
50
23
25
136
131
24
137
134
22

130

131
135
27
136

73a
73b
73c
7
73
A1
A2
72
6
63
235
230
50
75
26
236
24
220
22
61
72
71
73
78

62
73
71
72
235
230
237
238
7
73
236
6
231
237
XIII
26
55
51
220
52
50
11
53
22
XIII 8
63
81
73
50
72
230
61
62
236
11
22
235

LOADING DRIVE MECHANISM FOR DISK DRIVE

BACKGROUND OF THE INVENTION

The present invention relates to a loading drive mechanism for driving a disk loading system in a removable-media disk drive.

Removable data recording media, such as optical, magnetic, and magneto-optical disks, are either free (i.e., exposed) or housed in a cartridge. A cartridge protects the disk from debris or dust. In use, the cartridge-housed disks are inserted in the cartridge, while free disks are accepted in a retractable tray or inserted in a cartridge-like caddy.

A conventional data recording and reproducing device has systems for holding the cartridge or disk, for opening a cartridge shutter provided on the cartridge (if provided), for rotating the disk, and for recording/reading data on the disk using an optical or magnetic head.

Furthermore, the conventional data recording and reproducing device may have a motorized loading mechanism for carrying the cartridge or disk from insertion to a loading position, defined as the position in which data is recorded or read, and for carrying the cartridge or disk from the loading position to a discharging position in which the cartridge or disk can be removed from the device by hand.

Since the positioning of the loading mechanism is controlled by a number of components (including the motor, a positioning sensor, and a controller), if a component fails or performs abnormally, the motor can continue to operate after the unloading position is reached. In such a case, the motor can overload or the parts of the loading mechanism can break.

SUMMARY OF THE INVENTION

It is therefore an object of the present invention to provide an improved loading drive mechanism for a disk drive that prevents damage when a driving motor attempts to drive the system past the end of a predetermined range.

The present invention is directed to a loading drive mechanism that satisfies these needs. According to one aspect of the present invention, a loading drive mechanism for a disk drive includes a motorized driving unit for driving a driven gear. The driving unit includes a drive pinion. A driven gear is provided to a disk loading system that transports a disk within the disk drive. The driven gear is engageable to the drive pinion at a predetermined engaging position. A supporting device movably supports at least a portion of the driving unit or the driven gear to be movable away from the predetermined engaging position against the bias of a biasing device. The biasing device responds to a predetermined amount of force exerted by the driving unit by allowing the movably supported one of the driving unit or driven gear to disengage from the predetermined engaging position.

In a particular construction of this aspect of the invention, the driven gear includes a driven rack having engaging teeth engageable to the drive pinion at the engaging position.

According to one embodiment using this particular construction, the portion of the driving unit and the driven gear includes the engaging teeth, the supporting device includes a body of the rack, and the biasing device includes at least one resilient cantilevered portion extending from the rack. The resilient cantilevered portion (or portions) resiliently supports the engaging teeth, and responds to the predetermined amount of force exerted by the driving unit by allowing the engaging teeth to move away from the predetermined engaging position, i.e., the engaging teeth of the rack and the drive pinion disengage.

Accordingly, although the driven gear and drive pinion of the driving unit normally engage, when the predetermined amount of force exerted by the driving unit is exceeded, then the resilient cantilevered portion is moved away to disengage the teeth of the driven rack from the pinion. This movement is permitted by supporting the teeth to be movable with respect to the body of the rack away from the pinion. Furthermore, the resilient cantilevered portion keeps the rack teeth and pinion engaged until the predetermined amount of force is reached (or exceeded). Preferably, two resilient cantilevered portions are provided at opposite ends of the rack in a driving direction of the rack.

In another embodiment using this particular construction, the portion of the driving unit and the driven gear includes a body of the rack, the supporting device includes a pivot support pivotably supporting the body of the rack, and the biasing device includes at least one resilient cantilevered portion extending from the rack. The resilient cantilevered portion (or portions) engages a fixed portion of the disk loading system, and responds to the predetermined amount of force exerted by the driving unit by allowing the body of the rack to pivot away from the predetermined engaging position so that the engaging teeth of the rack and the drive pinion disengage.

Consequently, although the driven gear and drive pinion of the driving unit normally engage, when the predetermined amount of force exerted by the driving unit is exceeded, then the body of the rack is pivoted away to disengage the teeth of the driven rack from the pinion. This movement is permitted by supporting the body of the rack to be pivotable away from the pinion. Furthermore, the resilient cantilevered portion keeps the rack teeth and pinion engaged until the predetermined amount of force is reached or exceeded. Preferably, two resilient cantilevered portions are provided at opposite ends of the rack, in a driving direction of the rack.

In still another embodiment using this particular construction, the portion of the driving unit and the driven gear includes a body of the rack, the supporting device includes a pivot support pivotably supporting the body of the rack, and the biasing device includes a plate spring provided on a portion of the disk loading system and resiliently engaging the body of the rack. The plate spring responds to the predetermined amount of force exerted by the driving unit by allowing the body of the rack to pivot away from the predetermined engaging position, so that the engaging teeth of the rack and the drive pinion disengage.

Thus, although the driven gear and drive pinion of the driving unit normally engage, when the predetermined amount of force exerted by the driving unit is exceeded, then the body of the rack is pivoted away to disengage the teeth of the driven rack from the pinion. This movement is permitted by supporting the body of the rack to be pivotable away from the pinion. Furthermore, the plate spring keeps the rack teeth and pinion engaged until the predetermined amount of force is reached or exceeded.

In yet another embodiment using this particular construction, the portion of the driving unit and the driven gear includes a base of the driving unit, the supporting device includes a pivot support pivotably supporting the base, and the biasing device includes a tension spring connecting a stationary portion of the disk drive and the base. The tension spring responds to the predetermined amount of force exerted by the driving unit by allowing the driving unit to pivot away from the predetermined engaging position, i.e., the engaging teeth of the rack and the drive pinion disengage.

Accordingly, although the driven gear and drive pinion of the driving unit normally engage, when the predetermined amount of force exerted by the driving unit is exceeded, then the driving unit is pivoted away to disengage the drive pinion from the teeth of the driven rack. This movement is permitted by supporting the base of the driving unit to be pivotable away from the driven rack. Furthermore, the tension spring keeps drive pinion and the rack teeth engaged until the predetermined amount of force is reached or exceeded.

Preferably, in this aspect of the invention, the disk loading system has a transport range, and the predetermined amount of force exerted by the drive unit is reached when the drive unit continues to drive the driven gear past an end of the transport range.

According to another aspect of the invention, a loading drive mechanism, for driving a disk loading system in a disk drive, includes a drive unit having a motor driving a drive pinion, and a driven gear provided to the disk loading system. The driven gear engages the drive pinion. A supporting device supports a portion (or portions) of the driven gear to be movable away from the drive pinion. A biasing device biases the portion (or portions) of the driven gear to re-engage the drive pinion when the driven gear is moved away from the drive pinion.

In this manner, since the biasing device biases the driven gear to re-engage the drive pinion of the driving unit, they normally engage. However, a portion or portions of the driven gear is movable away from the drive pinion. This movement is permitted by supporting a portion (or portions) of the driven gear (up to and including the entire gear as appropriate) to be movable away from the drive pinion.

In a particular construction of this aspect of the invention, the driven gear includes a rack.

According to one embodiment using this particular construction, the rack is fixed to a movable portion of the disk loading system. The portion of the driven gear includes teeth of the rack, the supporting device includes a body of the rack, and the biasing device includes at least one deformable resilient cantilevered portion extending from the body of the rack and supporting the teeth of the rack. When the resilient cantilevered portion is deformed, the teeth of the rack are moved away from the drive pinion, and are biased by the resilient cantilevered portion to re-engage the drive pinion.

Accordingly, since the resilient cantilevered portion (or portions) biases the teeth of the rack to re-engage the drive pinion of the driving unit, they normally engage. However, the teeth of the rack are movable away from the drive pinion. This movement is permitted by supporting the teeth of the rack, with respect to the body of the rack, to be movable away from the drive pinion.

In another embodiment using this particular construction, the supporting device swingably supports the rack on the movable portion of the disk loading system. In this case, the supporting device may support the rack to be swingable substantially about the longitudinal center of the rack, and the biasing device biases both longitudinal ends of the rack to re-engage the drive pinion.

In this manner, since the biasing device biases the longitudinal ends of the swingable rack to re-engage the drive pinion of the driving unit, they normally engage. However, the rack is swingable away from the drive pinion. This movement is permitted by supporting the rack, about the longitudinal center, on the movable portion of the disk loading system.

In one variation of this embodiment, the biasing device includes at least one deformable resilient cantilevered portion extending from the body of the rack and contacting a stopper provided on the movable portion of the disk loading system. When the resilient cantilevered portion (or portions) is deformed, the rack swings away from the drive pinion, and is biased by resilient cantilevered portion (or portions) to re-engage the drive pinion.

In another variation of this embodiment, the biasing device includes a deformable resilient plate spring supported by a tab formed on the movable portion of the disk loading system and contacting the body of the rack. When the resilient plate spring is deformed, the rack swings away from the drive pinion, and is biased by the resilient plate spring to re-engage the drive pinion. In this case, the plate preferably contacts and biases both longitudinal ends of the rack.

According to still another aspect of the invention, a loading drive mechanism, for driving a disk loading system in a disk drive, includes a drive unit having a motor driving a drive pinion, and a driven gear provided to the disk loading system. The driven gear engages the drive pinion. A supporting device supports the drive unit to be movable away from the driven gear, while a biasing device biases the drive unit to re-engage the driven gear when the drive unit is moved away from the driven gear.

Accordingly, since the biasing device biases the driving unit, including the drive pinion, to re-engage the driven gear, they normally engage. However, the drive unit is movable away from the driven gear. This movement is permitted by supporting the driving unit to be movable away from the driven gear.

In one particular construction of this aspect of the invention, the driven gear includes a rack fixed to a movable portion of the disk loading system. Preferably, the biasing device includes a tension spring connected to the drive unit.

According to yet another aspect of the invention, a loading drive mechanism for a disk drive includes a motorized driving unit for driving a driven gear, including a drive pinion, and a driven gear provided to a disk loading system that transports a disk within the disk drive. The driven gear is engageable to the drive pinion. A disengaging device disengages the drive pinion and the system in response to a predetermined amount of force exerted by the driving unit.

In this case, the disk loading system preferably has a transport range, and the predetermined amount of force exerted by the drive unit is reached when the drive unit continues to drive the system past an end of the transport range.

According to yet still another aspect of the invention, a loading drive mechanism for a disk drive includes a motorized driving unit for driving a driven gear, including a drive pinion, and a driven gear provided to a disk loading system that transports a disk within the disk drive. The driven gear is engageable to the drive pinion. A disengaging mechanism disengages at least a portion of one of the driving unit and the driven gear to remove the motive force of the driving unit from the driven gear, in response to a predetermined amount of force exerted by the driving unit.

BRIEF DESCRIPTION OF THE DRAWINGS

FIG. 3 is a front sectional view of the assembled loading mechanism, taken substantially along the line III—III of FIG. 2;

FIG. 4 is a plan view of the loading drive mechanism of FIG. 2;

FIG. 5 is a plan view of the end of a rack of the loading drive mechanism of FIG. 2;

DETAILED DESCRIPTION OF THE PREFERRED EMBODIMENTS

Figure 1A:
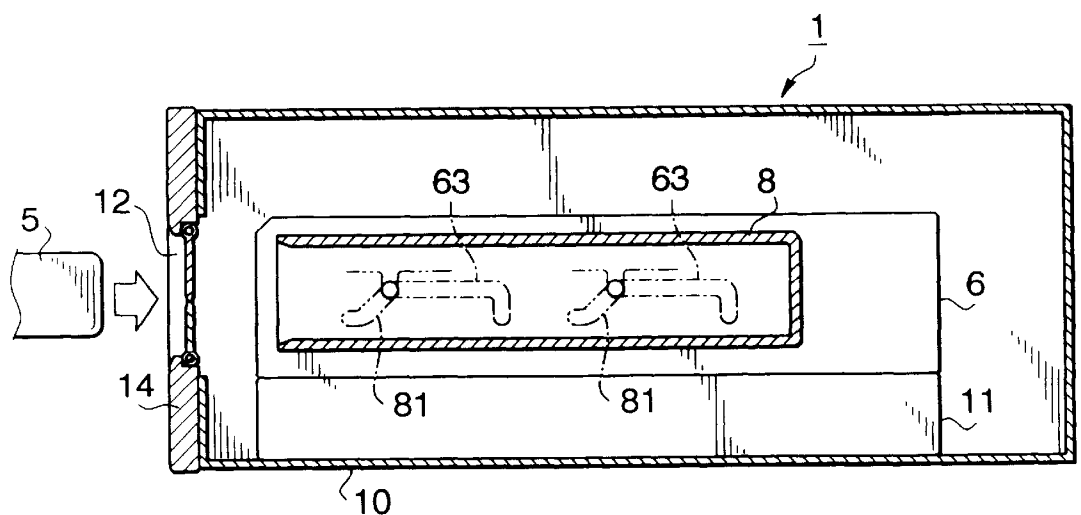
FIGS. 1A and 1B are side schematic views of a disk drive to which the embodiments of the present invention are applied.
Figure 1B:
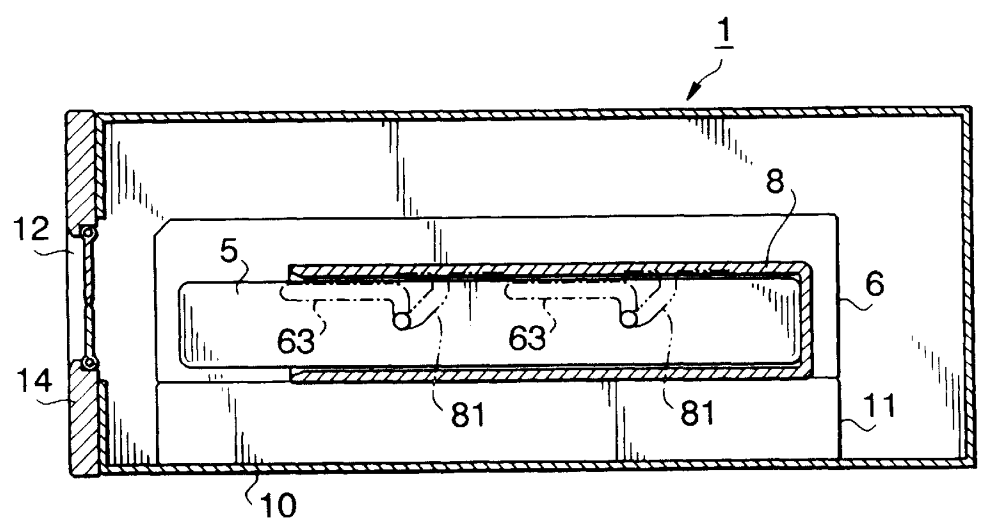

FIGS. 1A and 1B are side schematic views of a disk drive 1. The disk drive 1, in which data is recorded on or reproduced from a magneto-optical disk housed in a cartridge 5, is enclosed by a housing 10. A front panel 14 is provided to the front side of the housing 10.

An opening 12 for inserting the cartridge 5 is provided in the front panel 14. A cartridge holder 8 for holding the inserted cartridge 5 is provided in the disk drive 1. The cartridge holder 8 moves horizontally and downward from an unloaded position (as shown in FIG. 1A) to carry the cartridge 5 to a loading position (as shown in FIG. 1B). In the loading position, data may be recorded on and reproduced from the magneto-optical disk housed in the cartridge 5 using a magnetic head or optical head accommodated in a base unit 11 provided in the housing 10.

Figure 2:
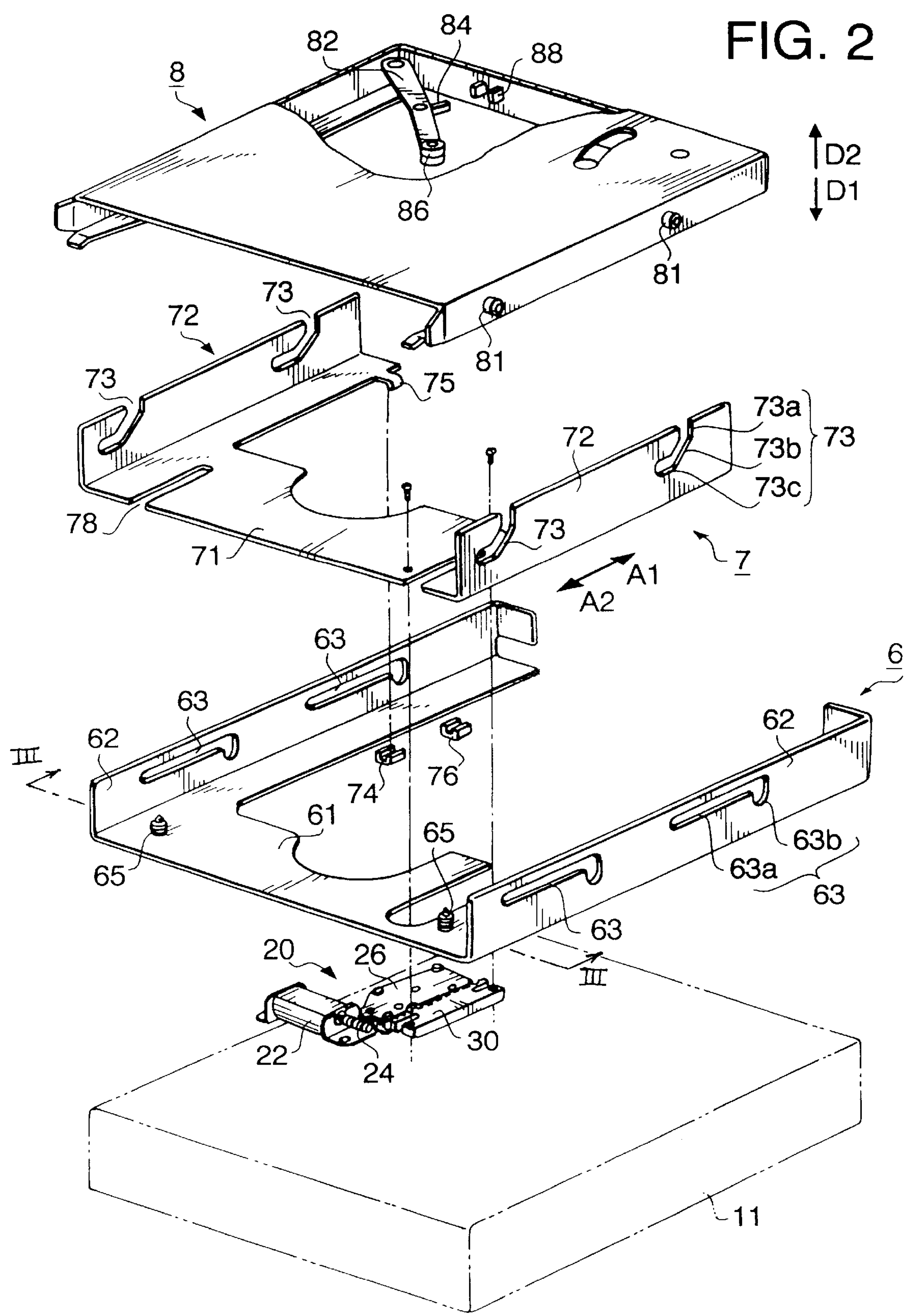
FIG. 2 is an exploded view showing a cartridge loading mechanism in which a first embodiment of a loading drive mechanism according to the invention is applied.

FIG. 2 is an exploded view showing a cartridge loading mechanism (as a disk loading system) for transporting the cartridge holder 8, cartridge 5, and enclosed disk, in which a first embodiment of a loading drive mechanism according to the invention is applied. As shown in FIG. 2, the cartridge loading mechanism includes a guide frame 6 and a sliding frame 7, provided on the base unit 11.

A swingable arm 82 is swingably supported in a rear corner of the cartridge holder 8. The swingable arm 8 has a roller 86 at its (swinging) distal end, and an actuator finger 84 on the rear side. When an inserted cartridge 5 pushes the roller 86 towards the rear side of the cartridge holder 8, the actuator finger 84 interrupts a cartridge insertion sensor 88 provided at the rear end of the cartridge holder 8. Accordingly, insertion of the cartridge 5 into the cartridge holder 8 is detected, starting the loading mechanism.

The guide frame 6 includes a bottom plate 61 and a pair of side walls 62, 62. Two guide grooves 63, 63 (front and rear) are formed in each of the side walls 62, 62. Each guide groove 63 is substantially L-shaped, each having a horizontal groove 63*a*, and a vertical groove 63*b* extending downward from the rear end of the horizontal groove 63*a*. The horizontal groove 63*a* guides movement of the cartridge holder 8 into the housing 10, and the vertical groove 63*b* guides movement of the cartridge holder 8 to the loading position.

The sliding frame 7 is supported within the guide frame 6 to slide in insertion and ejection directions A1 and A2. Frame 7 is restricted to movement only in the sliding direction by the engagement of a pair of pins 65 on the guide frame 6 with a pair of slots 78 formed in the sliding frame 7. The sliding frame 7 includes a bottom plate 71 and a pair of side walls 72, 72. Two cam grooves 73, 73 (front and rear) are formed in each of the side walls 72, 72. Each cam groove 73 has (1) a vertical groove 73*a* extending downward from the upper end of the side wall 72, (2) an inclined groove 73*b* extending downward from the bottom end of the vertical groove 73*a* towards the front side of the frame 7, and (3) a bottom groove 73*c* extending horizontally towards the front side of the frame 7 from the bottom end of the inclined groove 73*b*. A trigger member 75 is formed in the sliding frame 7 for actuating a unloaded position sensor 74 and a loading position sensor 76. The cam grooves 73 move the cartridge holder 8 to the loading position. The unloaded position sensor 74 and loading position sensor 76 are provided in the base unit 11. When the cartridge holder 8 is in the loading and unloading position, the actuator finger interrupts the loading position sensor 76 and unloaded position sensor 74, respectively.

As shown in FIG. 2, a loading drive mechanism 20 is provided in the base unit 11 for driving the sliding frame 7. The loading drive mechanism 20 includes: a rack 30 fixed to the sliding frame 7; and a driving unit including a pinion 27 engaging the rack 30, a motor 22 for driving the pinion 27, and a gear train 26 for transmitting the motive force of the motor 22 to the pinion 27.

FIG. 3 is a front sectional view of the assembled loading mechanism, taken substantially along the line III—III of FIG. 2, although only the region of the loading drive mechanism 20 is shown. As shown in FIG. 3, the rack 30 extends through the guide plate to the base unit. Each of the cam followers 81 formed on the cartridge holder 8 extend through a corresponding cam groove 73 and a corresponding guide groove 63.

FIG. 4 is a plan view of the loading drive mechanism 20. As shown in FIG. 4, the motor 22 of the driving unit includes a worm gear 24 fixed to a motor shaft of the motor 22, while the gear train 26 of the driving unit includes a worm wheel 25 engaging the worm gear 24. The gear train 26 includes several reduction gear sets for transmitting the motive force from the worm gear 24. The pinion 27 at the end of the gear train 26 engages the rack 30 at predetermined engaging positions defined by the intersection locus of the pitch lines of the pinion 27 and rack 30.

As shown in FIG. 4, a pair of notches 32 are formed in the longitudinal ends of the rack gear 30. The notches 32 extend a predetermined length along the length of the rack gear 30. The notches 32 form thin cantilevered portions 32*a*, which support gear teeth 31 at each longitudinal end (in the direction of the stroke of the rack 30). The thickness of the thin cantilevered portions 32*a* is selected such that the thin cantilevered portions 32*a* deflect away from the pinion 27 if the force exerted on the rack is sufficiently high, i.e., when the driving unit motor 22 continues to drive the tray past the end of the limit of the rack 30 (the transport range of the disk loading system). In normal operation, however, the rack 30 engages the pinion 27.

In normal loading operation, the disk cartridge 5 is inserted into the cartridge holder 8 and detected by the cartridge insertion sensor 88. In response, the driving unit motor 22 rotates in a predetermined (forward) direction, driving the rack 30 toward the insertion direction A1. The sliding frame 7 moves with the rack 30, and the cam grooves 73 guide the cam followers 81 along the horizontal grooves 63*a* of the guide grooves 63. When the cam followers 81 reach the rear end of the horizontal groove 63*a*, the cam grooves 73 guide the cam followers along the vertical grooves 63*b* of the guide grooves 63. When the cam followers 81 reach the bottom of the vertical grooves 63*b* (that is, when the cartridge holder 8 reaches loading position), the cartridge holder 8 is held in the loading position by the engagement of the cam followers 81 and the bottom grooves 73*c*. Furthermore, when the cartridge 5 reaches the loading position, the loading position sensor 76 detects the actuator finger 75 on the sliding frame 7, stopping unit motor 22.

During normal unloading operation, the driving unit motor 22 rotates in a reverse direction to drive the rack 30 in the ejection direction A2. The sliding frame 7 moves with the rack 30, and the cam grooves 73 drive the cam followers upward along the vertical grooves 63*b* of the guide grooves 63. When the cam followers 81 reach the top end of the vertical grooves 63*b*, the cam grooves 73 guide the cam followers 81 along the horizontal grooves 63*a* of the guide grooves 63. Furthermore, when the cartridge holder 8 reaches the unloaded position, the actuator finger 75 is detected by the unloaded position sensor 74, stopping the driving unit motor 22.

The range from the unloaded position to the loading position is the normal transport range of the cartridge loading mechanism. If, however, the operation of the device is abnormal, for example, when the cartridge holder 8 has already reached the loading or unloaded position, if one of the sensors 74, 76 fails, or if the driving unit motor 22 does not respond to the sensors 74, 76, then the driving unit motor 22 may be overdriven. When the driving unit motor 22 is overdriven, the rotating pinion 27 continues to drive the immovable rack 30, exceeding a predetermined amount of force corresponding to the normal maximum driving force within the normal transport range. In such a situation, the thin cantilevered portions 32*a*, 32*a* (and gear teeth 31 thereon) at front and rear ends of the rack 30 resiliently deform away from the pinion 27, as shown in FIG. 5. Accordingly, the rack 30, the pinion 27, the gear train 26, and the driving unit motor 22 are not subject to excessive stress, and breakage of one or more parts of the loading drive mechanism 20 is prevented.

Although the rack 30 and pinion 27 of the driving unit normally engage, when the driving unit continues to drive past the end of the disk transport range when the cartridge holder 8 has already reached the loading or unloaded position (exceeding a predetermined amount of force exerted by the driving unit) then one of the thin cantilevered portions 32*a* moves away to disengage the teeth 31 of the driven rack 30 from the pinion 27. This movement is permitted by supporting the teeth 31 to be movable, with respect to the body of the rack 30, away from the pinion 27. Furthermore, the thin cantilevered portions 32*a* keep the rack teeth 31 and pinion 27 engaged until the predetermined amount of force is reached or (exceeded).

A second embodiment of a loading drive mechanism 120 according to the invention is shown in FIGS. 6 through 10. The second embodiment is applied to the same loading mechanism and disk drive 1 as the first embodiment. Accordingly, portions of the loading mechanism and disk drive not described with respect to the second embodiment are identical to those described with respect to the first embodiment.

Figure 6:
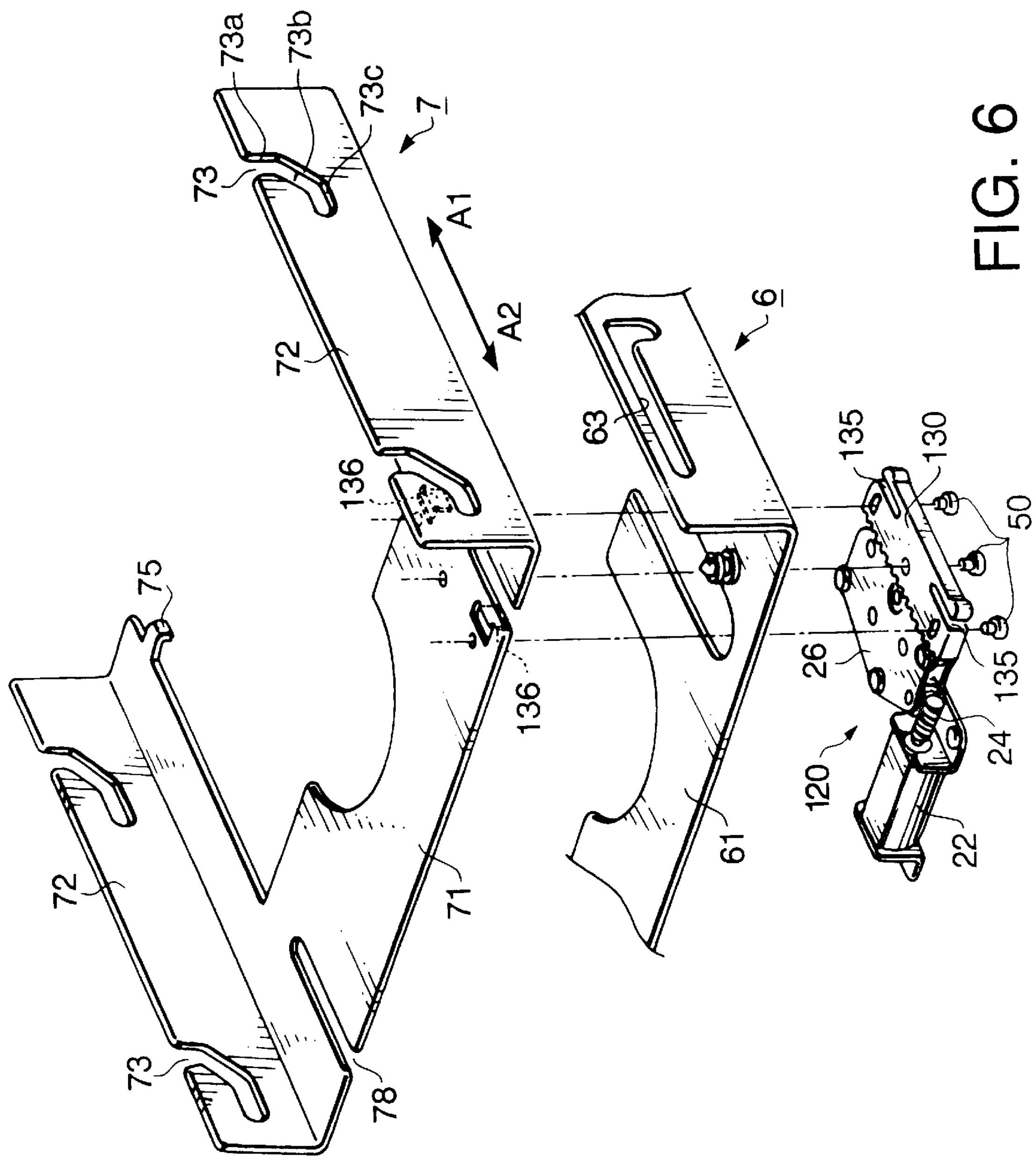
FIG. 6 is an exploded view of a second embodiment of a loading drive mechanism according to the invention.

FIG. 6 is a partial exploded view of the sliding frame 7, the guide frame 6, and a loading drive mechanism 120. Although in FIG. 6 only a portion of the guide frame 6 is shown, the remaining portions of the guide frame 6 are identical to those previously described.

Figure 7:
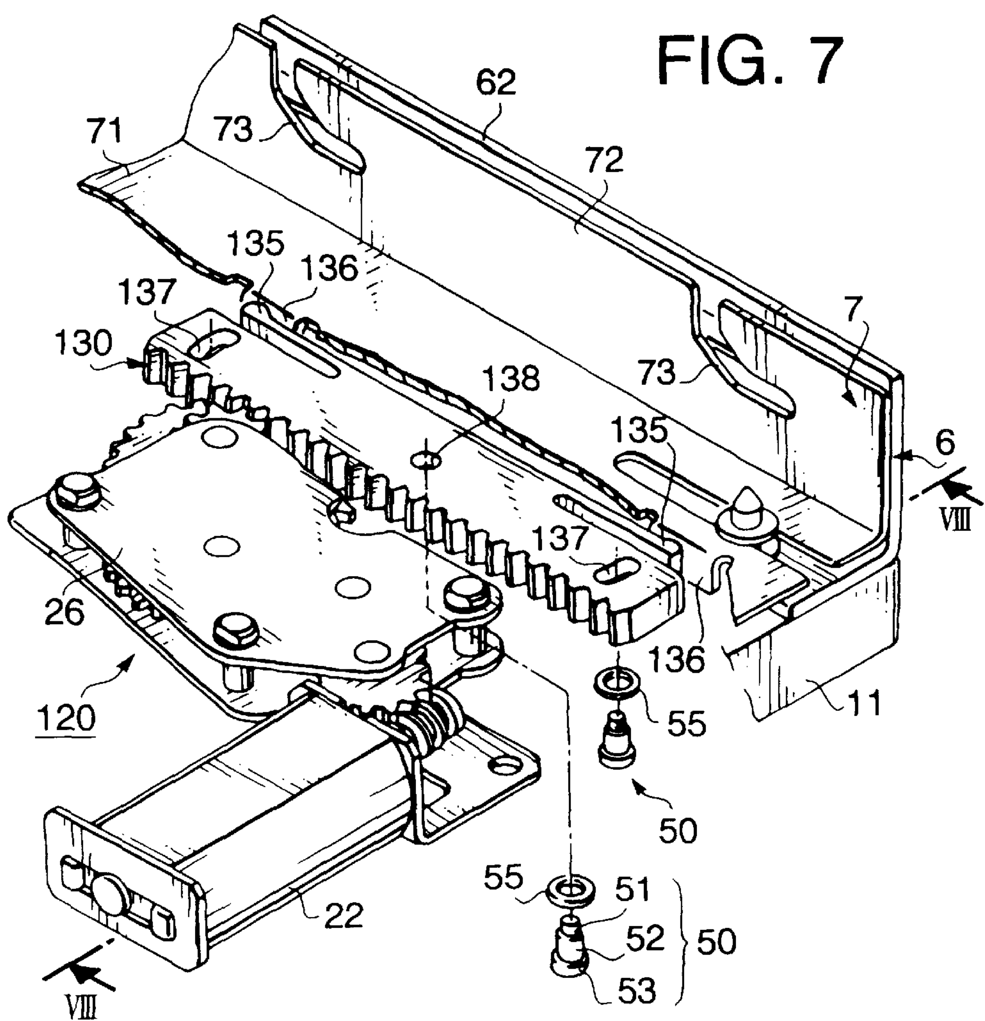
FIG. 7 is a perspective view of the vicinity of the second embodiment of a loading drive mechanism.
Figure 8:
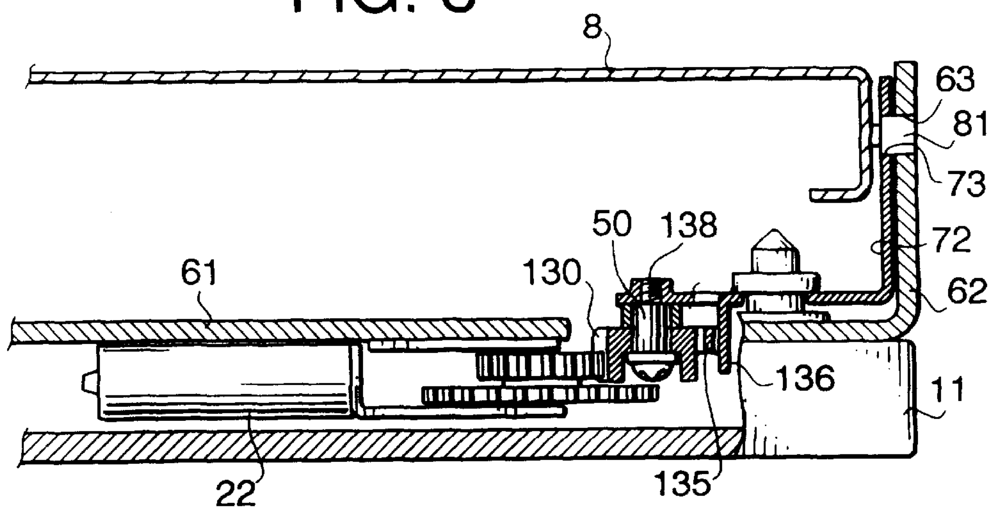
FIG. 8 is a front sectional view taken substantially along line VIII—VIII of FIG. 7.
Figure 9:
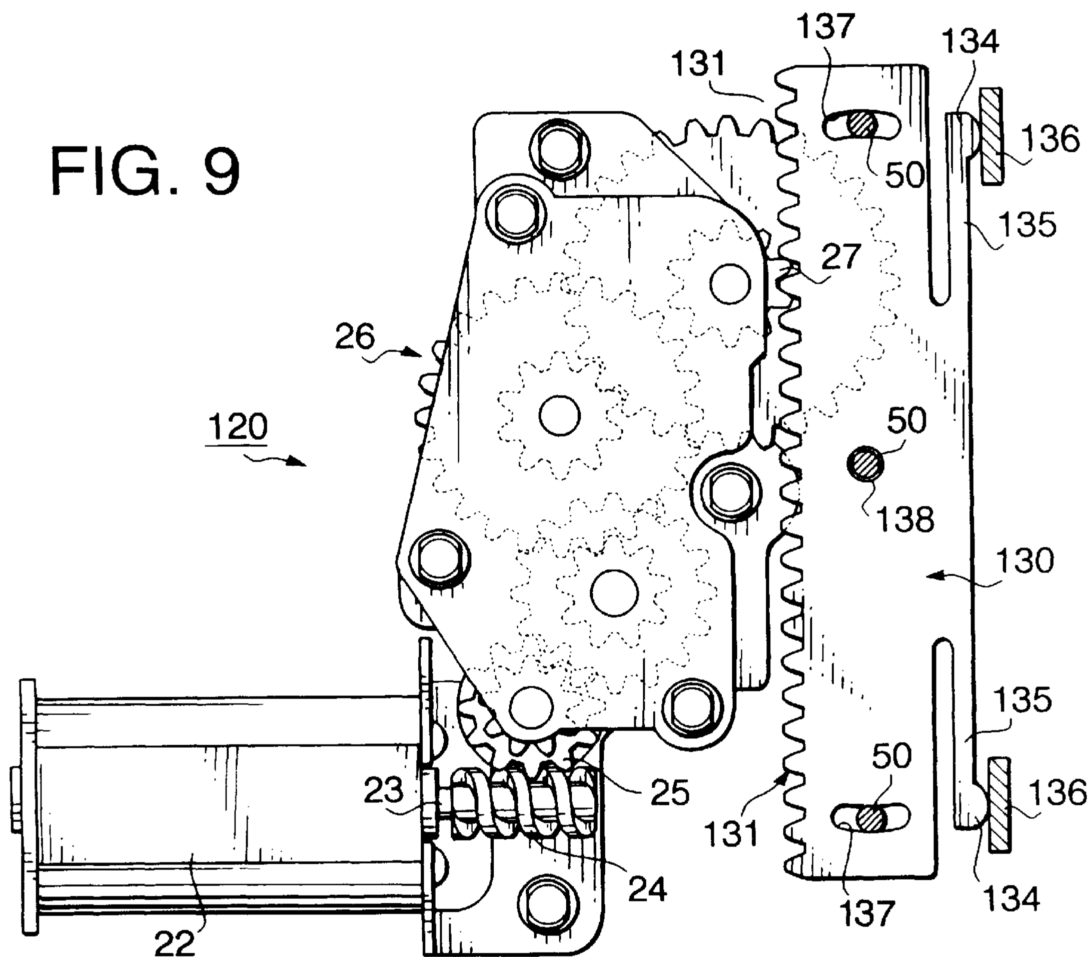
FIG. 9 is a plan view of the second embodiment of a loading drive mechanism.
Figure 10:
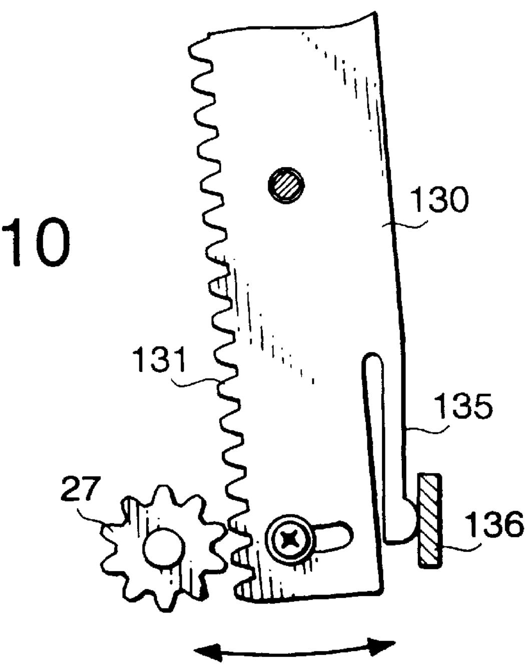
FIG. 10 is a plan view of the end of a rack according to the second embodiment.

FIG. 7 is a perspective view of the vicinity of the loading drive mechanism 120 according to the invention, FIG. 8 is a front sectional view taken substantially along line VIII—VIII of FIG. 7, FIG. 9 is a plan view of the loading drive mechanism 120, and FIG. 10 is a partial plan view of the end of a rack 130.

As with the first embodiment, as shown in FIGS. 7 through 9, the driving unit motor 22 includes a worm gear 24 fixed to a motor shaft of the motor 22, while the gear train 26 includes a worm wheel 25 engaging the worm gear 24. The gear train 26 includes several reduction gear sets for transmitting the motive force from the worm gear 24. The pinion 27 at the end of the gear train 26 engages teeth 131 of a rack 130 at predetermined engaging positions defined by the intersection locus of the pitch lines of the pinion 27 and rack 130.

Referring now to FIGS. 7 through 9, the rack 130 is resiliently swingable with respect to the sliding frame 7.

A pivot hole 138 is formed at the longitudinal center of the body of the rack 130, vertically penetrating the body of the rack 130. An arcuate slot 137 is formed at each longitudinal ends of the body of the rack 130. The two arcuate slots 137, 137 each form an arc of an imaginary circle having a center at the pivot hole 138.

Three fixed pins 50 support the body of the rack 130 on the bottom plate 71 of the sliding frame 7, passing through the pivot hole 138 and arcuate slots 137, 137. Each pin 50 has a threaded portion 51, an unthreaded cylindrical neck 52, and a head 53. The rack 130 is supported by the heads 53 of the pins 50 via washers 55, and the necks 52 extend through pivot hole 138 and arcuate slots 137, 137. The body of the rack 130 is thus horizontally swingable (pivotable) about the longitudinal center (the pivot hole 138).

Two resilient cantilever arms 135, 135 (front and rear) are formed in the rack 130, at the side opposite the gear teeth 131. The two resilient cantilever arms 135, 135 extend from the middle portion of the body of the rack 130 parallel to the length of the rack 130.

The distal ends of the resilient cantilever arms 135 are rounded, and project in a direction away from the gear teeth 31. The distal ends of the resilient cantilever arms 135, 135 abut two stoppers 136, 136 (front and rear) formed in the bottom plate 71 of the sliding frame 7 at positions corresponding to the distal ends of the resilient cantilever arms 135, 135.

The normal operation of loading and unloading is identical to that previously described with reference to the first embodiment. In this case, since the resilient cantilever arms 135, 135 abut the stoppers 136, 136, the rack 130 engages the pinion 27.

If the operation of the device is abnormal as previously described, i.e., when the driving unit motor 22 continues to operate when the cartridge holder 8 has already reached either the loading or unloaded position, then the rotating pinion 27 continues to drive the immovable rack 130, exceeding a predetermined amount of force corresponding to the normal maximum driving force within the normal transport range.

In this case, since the rack 130 is swingable about the longitudinal center (the pivot hole 138 and supporting pin 50), as shown in FIG. 10, the rack teeth 131 are moved away from the pinion 27, and can be resiliently returned by the resilient cantilever arms 135, 135. Accordingly, the rack 30, the pinion 27, the gear train 26, and the driving unit motor 22 are not subject to excessive stress, and breakage of one or more parts of the loading drive mechanism 20 is prevented.

Although the rack 130 and pinion 27 of the driving unit normally engage, when the driving unit continues to drive past the end of the disk transport range when the cartridge holder 8 has already reached either the loading or unloaded position, then the body of the rack 130 is pivoted away to disengage the teeth 131 of the driven rack 130 from the pinion 27. This movement is permitted by supporting the body of the rack 130 to be pivotable away from the pinion 27. Furthermore, the resilient cantilever arms 135 keep the rack teeth 131 and pinion 27 engaged until the predetermined amount of force is reached (or exceeded).

A third embodiment of a loading drive mechanism 220 according to the invention is shown in FIGS. 11 through 15. The third embodiment is applied to the same loading mechanism and disk drive 1 as the first and second embodiments. Accordingly, portions of the loading mechanism and disk drive not described with respect to the third embodiment are identical to those described with respect to the first and second embodiments.

Figure 11:
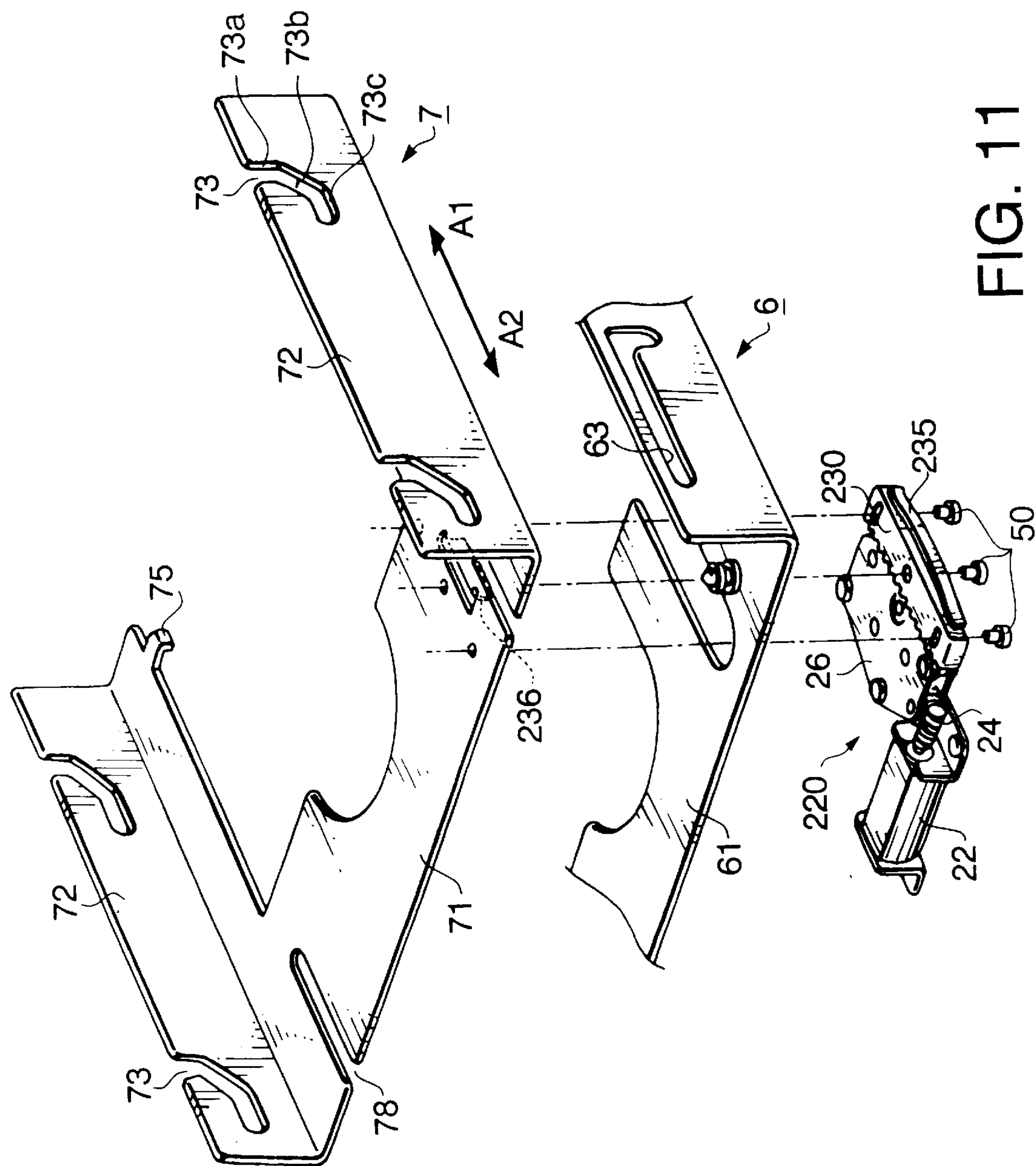
FIG. 11 is an exploded view of a third embodiment of a loading drive mechanism 220.

FIG. 11 is a partial exploded view of the sliding frame 7, the guide frame 6, and the loading drive mechanism 220. Although in FIG. 11 only a portion of the guide frame 6 is shown, the remaining portions of the guide frame 6 are identical to those previously described.

Figure 12:
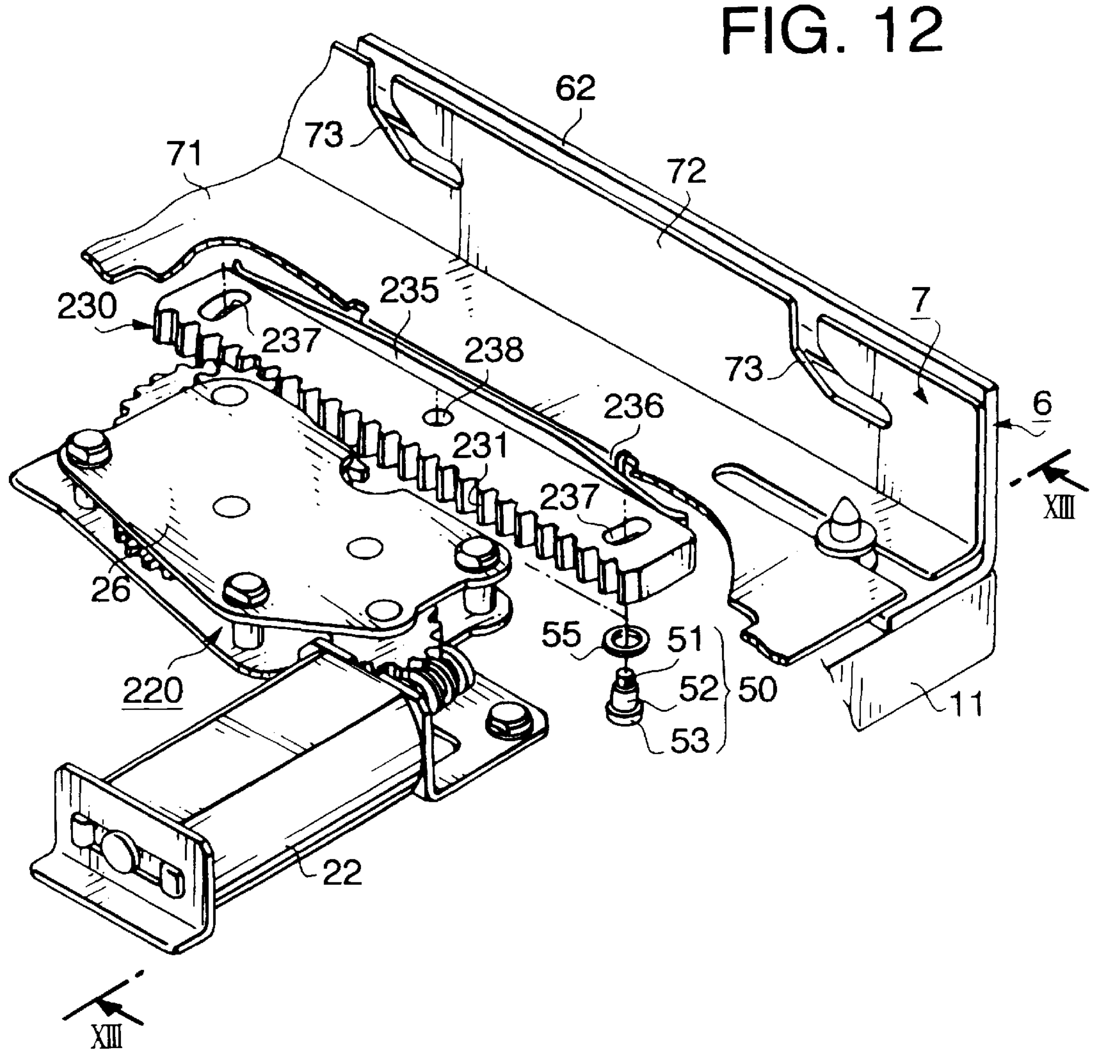
FIG. 12 is a perspective view of the vicinity of the third embodiment of a loading drive mechanism.
Figure 13:
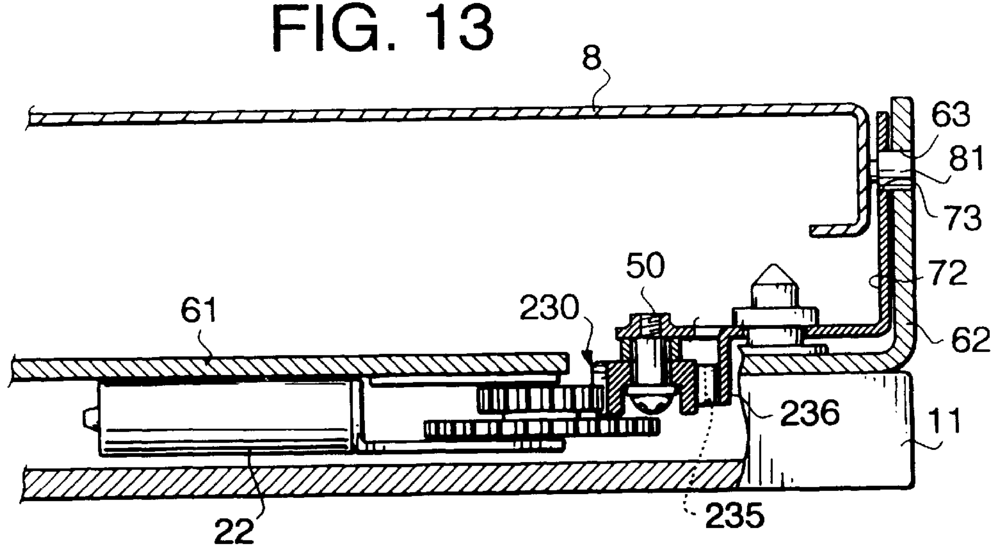
FIG. 13 is a front sectional view taken substantially along line XIII—XIII of FIG. 12.
Figure 14:
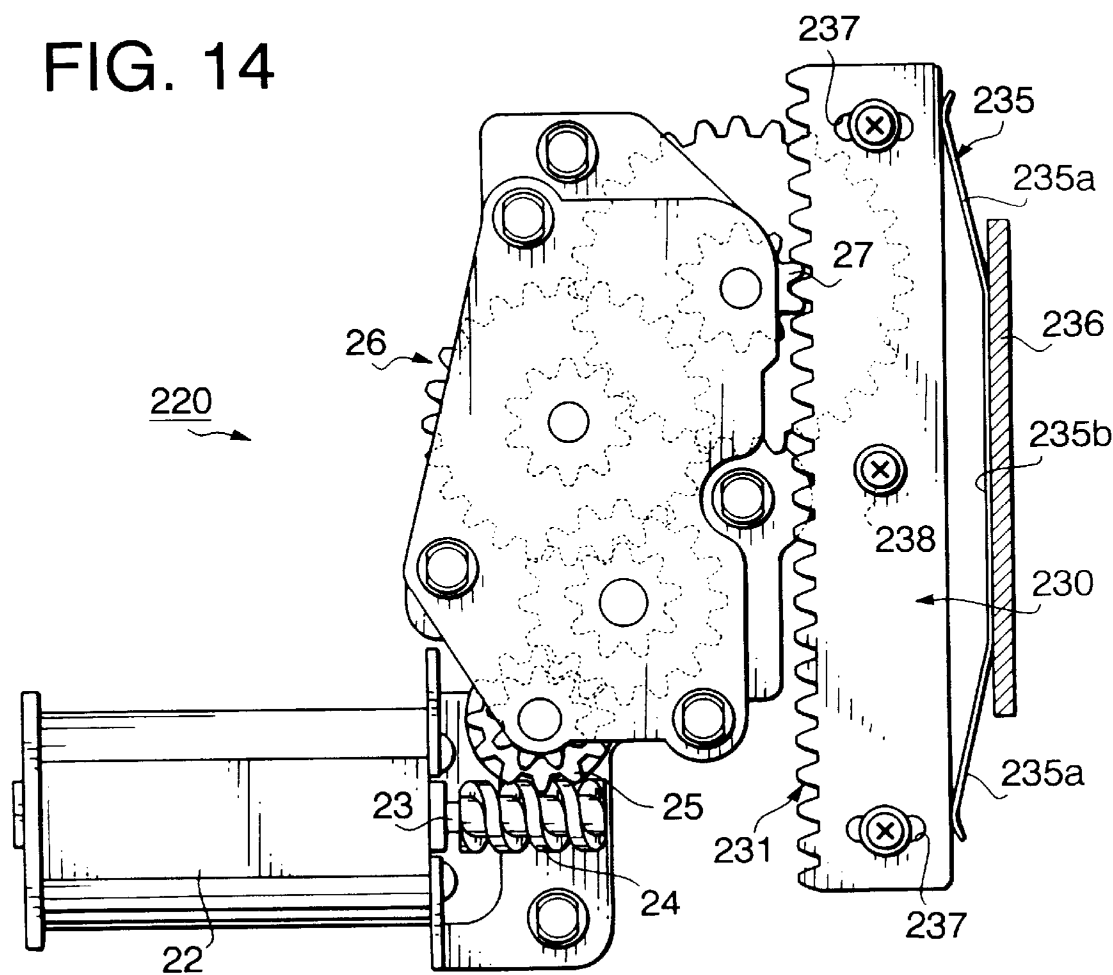
FIG. 14 is a plan view of the third embodiment of a loading drive mechanism.
Figure 15:
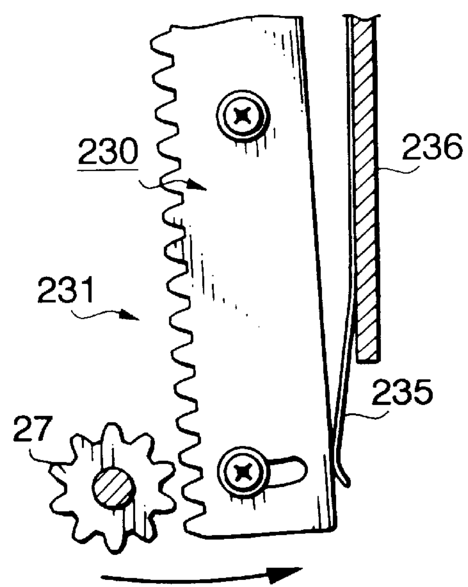
FIG. 15 is a partial plan view of the end of a rack 230 according to the third embodiment.

FIG. 12 is a perspective view of the vicinity of the loading drive mechanism 220 according to the invention, FIG. 13 is a front sectional view taken substantially along line XIII—XIII of FIG. 12, FIG. 14 is a plan view of the loading drive mechanism 220, and FIG. 15 is a partial plan view of the end of a rack 230.

As with the first and second embodiments, as shown in FIGS. 12 through 14, the driving unit motor 22 includes a worm gear 24 fixed to a motor shaft of the motor 22, while the gear train 26 includes a worm wheel 25 engaging the worm gear 24. The gear train 26 includes several reduction gear sets for transmitting the motive force from the worm gear 24. The pinion 27 at the end of the gear train 26 engages teeth 231 of a rack 230 at predetermined engaging positions defined by the intersection locus of the pitch lines of the pinion 27 and rack 230.

Referring now to FIGS. 12 through 14, the body of the rack 230 is swingable (pivotable) with respect to the sliding frame 7, and resiliently biased by a plate spring 235 to return when displaced.

A pivot hole 238 is formed at the longitudinal center of the body of the rack 230, vertically penetrating the rack 230. An arcuate slot 237 is formed at each longitudinal end of the body of the rack 230. The two arcuate slots 237, 237 each form an arc of an imaginary circle having a center at the pivot hole 238.

Three fixed pins 50 support the body of the rack 230 on the bottom plate 71 of the sliding frame 7, passing through the pivot hole 238 and arcuate slots 237, 237. Each pin 50 has a threaded portion 51, an unthreaded cylindrical neck 52, and a head 53. The rack 230 is supported by the heads 53 of the pins 50 via washers 55, and the necks 52 extend through pivot hole 238 and arcuate slots 237, 237. The rack 230 is thus horizontally swingable about the longitudinal center (the pivot hole 238).

In contrast to the first and second embodiments, the rack 230 does not include either notches or cantilever arms. However, a plate spring 235 is provided on the side of the rack 30 opposite to the teeth 231, and a spring support tab 236 is bent downward from the bottom plate 71 of the slidable member.

As shown in FIG. 14, the length of the plate spring 235 is substantially the same as that of the rack 230. The plate spring 235 has a center portion **235*b*, from which two side portions 235*a*, 235*a* (front and rear) are bent. The center portion 235*b* is fixed to the spring support tab 236, and the side portions 231 abut the front and rear ends of the rack 230 on the opposite side of the gear teeth 231**.

The normal operation of loading and unloading is identical to that previously described with reference to the first embodiment. In this case, since both longitudinal ends of the rack 230 are biased by the plate spring 235, the rack 230 engages the pinion 27.

If the operation of the device is abnormal as previously described, i.e., when the driving unit motor 22 continues to operate when the cartridge holder 8 has already reached the loading or unloaded position, then the rotating pinion 27 continues to drive the immovable rack 230, exceeding a predetermined amount of force corresponding to the normal maximum driving force within the normal transport range.

In this case, as shown in FIG. 15, the rack 230 is swingable about the longitudinal center. The rack teeth 231 move away from the pinion 27 against the bias of the plate spring 235. Accordingly, the rack 30, the pinion 27, the gear train 26, and the driving unit motor 22 are not subject to excessive stress, and breakage of one or more parts of the loading drive mechanism 20 is prevented.

Although the rack 230 and pinion 27 of the driving unit normally engage, when the driving unit continues to drive past the end of the disk transport range when the cartridge holder 8 has already reached the loading or unloaded position, exceeding a predetermined amount of force exerted by the driving unit, then the body of the rack 230 is pivoted away to disengage the teeth 231 of the driven rack 230 from the pinion 27. This movement is permitted by supporting the body of the rack 230 to be pivotable away from the pinion 27. Furthermore, the plate spring 235 keeps the rack teeth 231 and pinion 27 engaged until the predetermined amount of force is reached or exceeded.

A fourth embodiment of a loading drive mechanism 320 according to the invention is shown in FIGS. 16 through 19. The fourth embodiment is applied to the same loading mechanism and disk drive 1 as the first through third embodiments. Accordingly, portions of the loading mechanism and disk drive not described with respect to the fourth embodiment are identical to those described with respect to the first through third embodiments.

Figure 16:
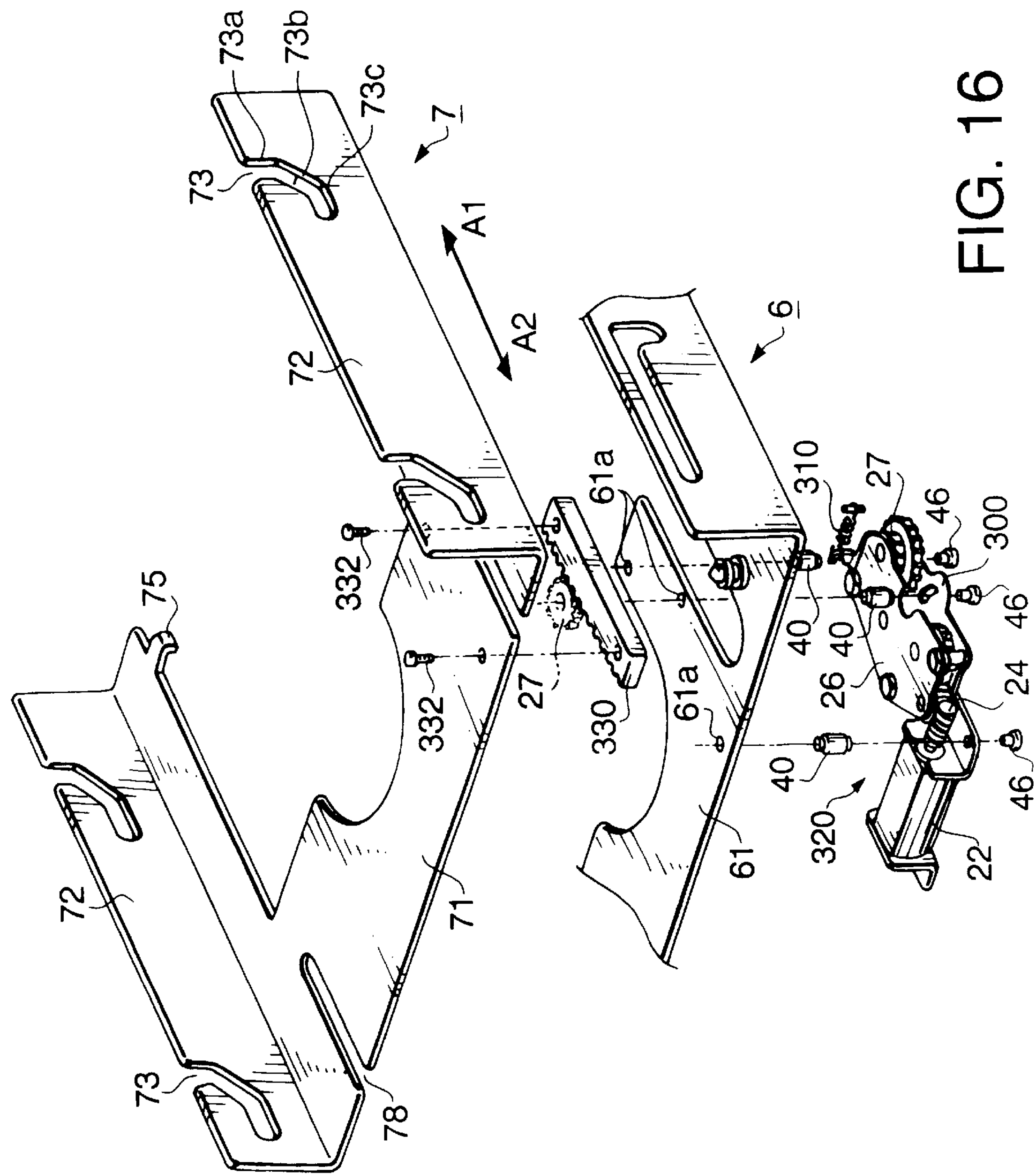
FIG. 16 is an exploded view of a fourth embodiment of a loading drive mechanism.

FIG. 16 is a partial exploded view of the sliding frame 7, the guide frame 6, and the loading drive mechanism 320. Particularly, although in FIG. 16 only a portion of the guide frame 6 is shown, the remaining portions of the guide frame 6 are identical to those previously described.

Figure 17:
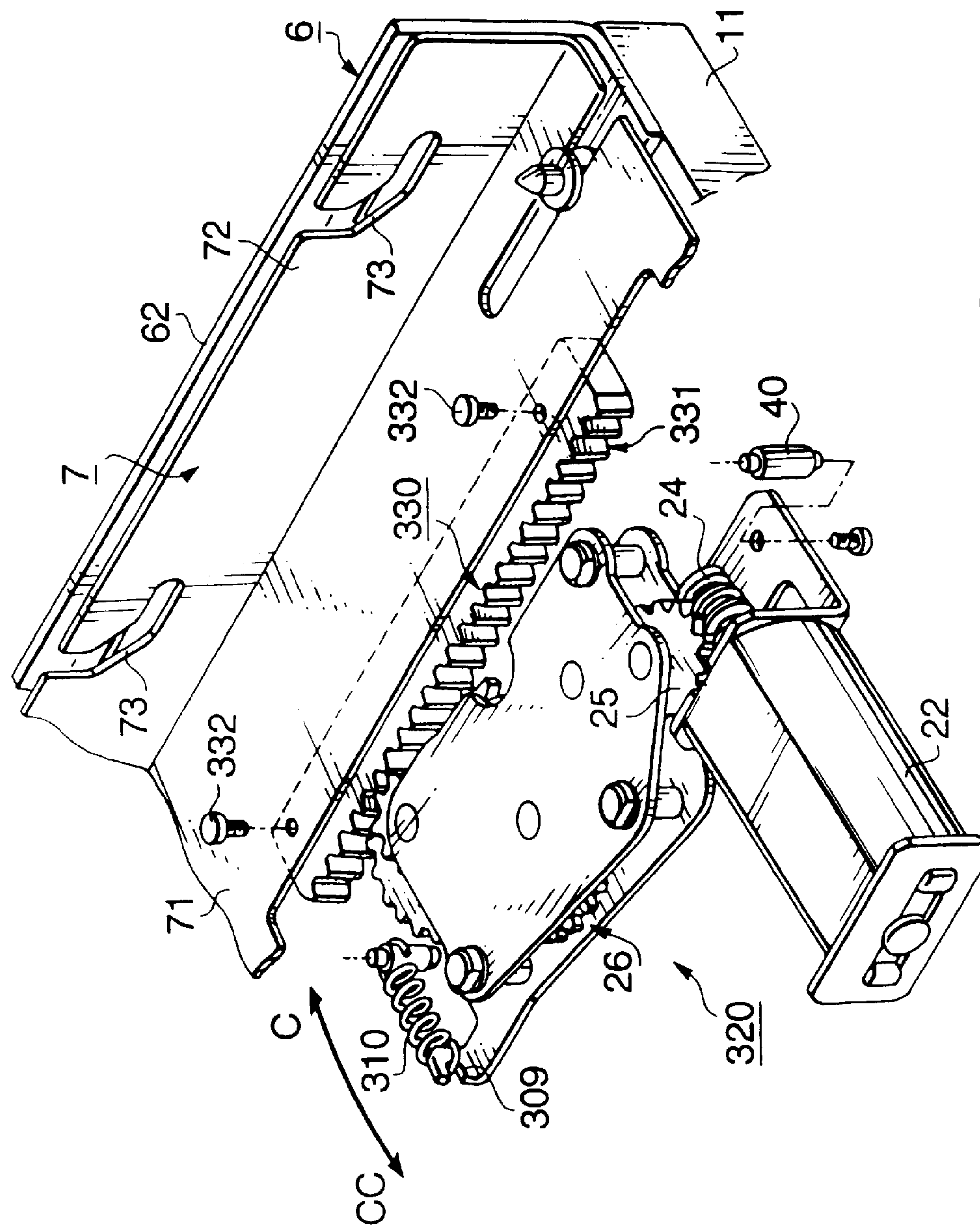
FIG. 17 is a perspective view of the vicinity of the fourth embodiment of a loading drive mechanism.
Figure 18:
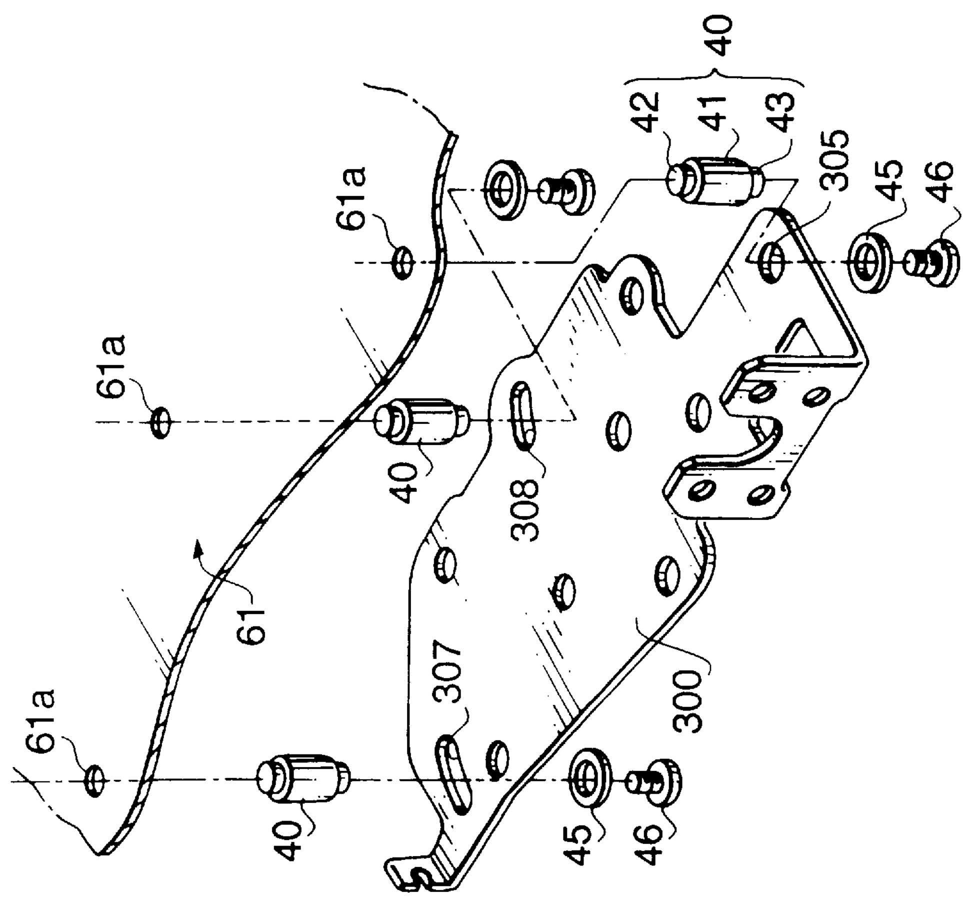
FIG. 18 is an exploded view of a unit base of the fourth embodiment of a loading drive mechanism 320.
Figure 19:
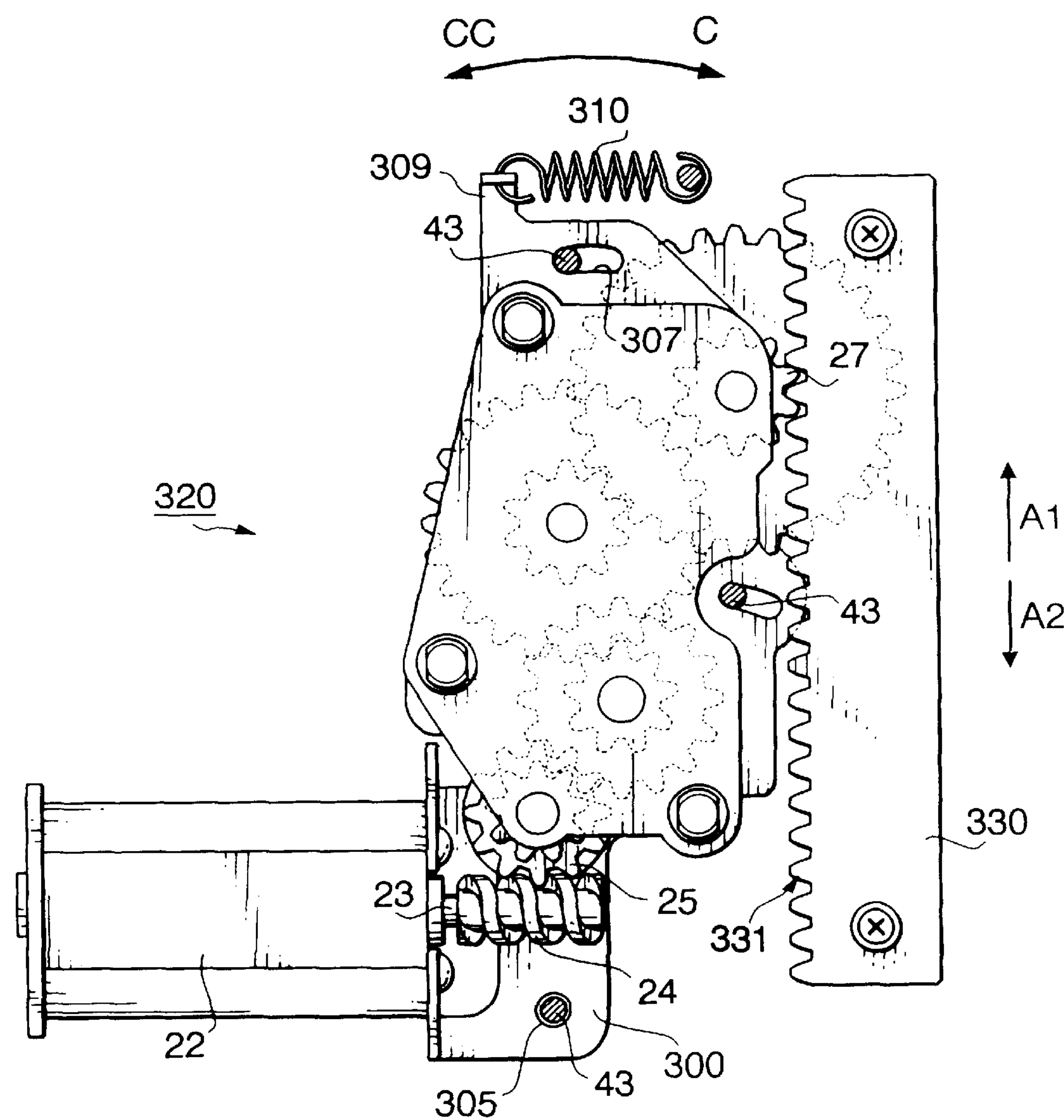
FIG. 19 is a plan view of the fourth embodiment of a loading drive mechanism.

FIG. 17 is a perspective view of the vicinity of the loading drive mechanism 320 according to the invention, FIG. 18 is an exploded view of a unit base 300 of the loading drive mechanism 320, and FIG. 19 is a plan view of the loading drive mechanism 320.

As with the first through third embodiments, as shown in FIGS. 16 through 19, the driving unit motor 22 includes a worm gear 24 fixed to a motor shaft of the motor 22, while the gear train 26 includes a worm wheel 25 engaging the worm gear 24. The gear train 26 includes several reduction gear sets for transmitting the motive force from the worm gear 24. The pinion 27 at the end of the gear train 26 engages teeth 331 of a rack 330 at predetermined engaging positions defined by the intersection locus of the pitch lines of the pinion 27 and rack 330.

Referring now to FIGS. 16 through 19, the rack 330 is fixedly secured to the sliding frame 7. The driving unit motor 22, gear train 26, and pinion 27 are swingable with respect to the sliding frame 7, the rack 330, and the guide frame 6, under bias by a tension spring 310.

As shown in FIGS. 16, 17, and 19, the rack 330 is secured to the bottom plate 71 of the sliding frame 71. The driving unit of the loading drive mechanism 320, including the motor 22, worm gear 24, gear train 26, and pinion 24, is supported by a unit base 300.

FIG. 18 shows the unit base 300 and the bottom plate 61 of the guide frame 6, with the driving unit motor 20, various gears of the drive assembly of the loading drive mechanism 320, and a top support plate of the gear train 26 removed. As shown in FIG. 18, the unit base 300 is swingably mounted to the bottom plate 61 of the guide frame 6. A pivot hole 305 is formed at the front of the unit base 300, and two arcuate slots 307, 308 are formed at the rear and side of the unit base 300, respectively. The arcuate slots 307, 308 each form an arc of an imaginary circle having a center at the pivot hole 305.

Three fixed pillars 40 separate the unit base 300 from the bottom plate 61. Each pillar 40 is formed as a cylindrical body 41, having a threaded portion 42 at the top and an internally threaded pin 43 at the bottom. The threaded portions 42 respectively engage corresponding screw holes 61 a formed in the bottom plate 61, and the three (fixed) pins 43 respectively pass through the pivot hole 305 and the two arcuate slots 307, 308. The base unit is supported with respect to the pins 43 by screws 46 and washers 46 fitted to the internal threads of each of the pins 43. In this manner, the unit base 300, and therefore the entire loading drive mechanism 320 excluding the rack 330, is horizontally swingable about the pin 43 and pivot hole 305 at the front end thereof.

FIG. 19 is a plan view showing the loading drive mechanism 320. As shown in FIG. 19, a tension spring 310, fixed at one end with respect to the guide frame 6 and base 11, is connected at the remaining end to a hook 309 on the base unit 300 at an end (the rear) of the base unit 300 opposite the pivot hole 305. The tension spring biases the unit base 300 toward the rack 330, so that the pinion 27 engages the rack 330.

The normal operation of loading and unloading is identical to that previously described with reference to the first embodiment. In this case, since the unit base 300 is biased by the tension spring 310, the pinion 27 surely engages the rack 330.

If the operation of the device is abnormal as previously described, i.e., when the motor 22 of the driving unit continues to move the cartridge holder 8 when it has already reached either the loading or unloaded position, then the rotating pinion 27 continues to drive the immovable rack 330, exceeding a predetermined amount of force corresponding to the normal maximum driving force within the normal transport range.

In this case, since the unit base 300 is swingable about the pivot hole 305 and corresponding pin 43, the pinion 27 (and driving unit, including the entire loading drive mechanism 320 excepting the rack 330) moves away from the rack 330, and can be resiliently returned by the tension spring 310. Accordingly, the rack 330, the pinion 27, the gear train 26, and the driving unit motor 22 are not subject to excessive stress, and breakage of one or more parts of the loading drive mechanism 20 is prevented.

The fourth embodiment has the additional advantage that the driving unit can swing away from the rack 330 at any point along the travel of the rack 330, and not just at the ends thereof. Accordingly, if disk loading system undergoes an unexpected external force, the driving unit may react to prevent excessive stress.

Although the driven rack 330 and drive pinion 27 of the driving unit normally engage, when the predetermined amount of force exerted by the driving unit is exceeded, then the unit base 300, carrying the driving unit, is pivoted away to disengage the drive pinion 27 from the teeth 331 of the driven rack 330. This movement is permitted by movably supporting the base 300 of the driving unit to be pivotable away from the driven rack 330. Furthermore, the tension spring 310 keeps the drive pinion 27 and the rack teeth 331 engaged until the predetermined amount of force is reached (or exceeded).

In the described embodiments, a portion of the rack, the entire rack, or the driving unit (that is, the motor 20, the worm gear 24, the gear train 26, and the pinion 27) is movable and resiliently biased to engage the opposing member, so that the engagement between the rack and driving pinion is released when the motor of the driving unit is overdriven. That is, at least a portion of one of the driven rack or driving unit is swingable away from the engagement of the rack and driving unit. More broadly, a portion of one of the driving unit and a driven unit (for example, the rack or portions thereof, including associated resilient parts, if provided) is resiliently movable away from the other when more than a predetermined amount of force is applied by the driving unit, such as when the driving unit continues to drive the driven unit at the end of its movement range.

The present disclosure relates to subject matter contained in Japanese Patent Application Nos. HEI 07-172687, HEI 07-172814, and HEI 07-172909, all filed on Jun. 15, 1995, and No. HEI 07-174485, filed on Jun. 16, 1995, which are expressly incorporated herein by reference in their entireties.

What is claimed is:

1. A loading drive mechanism for a disk drive, comprising:

a motorized driving unit for driving a driven gear, said driving unit including a drive pinion;

said driven gear being provided to a disk loading system that transports a disk within said disk drive, said driven gear being engageable to said drive pinion at a predetermined engaging position;

a supporting mechanism supporting and selectively disengaging at least a portion of one of said driving unit and said driven gear from said predetermined engaging position; and a biasing mechanism resiliently biasing said at least a portion of one of said driving unit and said driven gear, said biasing mechanism responding to a predetermined amount of force exerted by said driving unit by allowing said at least a portion of one of said driving unit and said driven gear to move from said predetermined engaging position so that said driven gear and said drive pinion disengage so that the rotation of the drive pinion is not transmitted to the driven gear.

2. The loading drive mechanism according to claim 1, wherein said driven gear includes a driven rack having engaging teeth engageable to said drive pinion at said predetermined engaging position.

3. The loading drive mechanism according to claim 2, wherein said at least a portion of said driving unit and said driven gear includes a body of said rack, said supporting mechanism includes a pivot support which pivotably supports said body of said rack, and said biasing mechanism includes at least one resilient cantilevered portion extending from said rack, said at least one resilient cantilevered portion engaging a portion of said disk loading system, and wherein said at least one resilient cantilevered portion responds to said predetermined amount of force exerted by said driving unit by allowing said body of said rack to pivot away from said predetermined engaging position so that said engaging teeth of said rack and said drive pinion disengage.

4. The loading drive mechanism according to claim 3, wherein said at least one resilient cantilevered portion includes two resilient cantilevered portions provided at opposite ends of said rack in a driving direction of said rack.

5. The loading drive mechanism according to claim 4, wherein said pivot support includes:

a first fixed pin;

a pivot hole formed in said body of said rack and mounted to said first fixed pin;

a second fixed pin; and an arcuate slot formed in said body of said rack and mounted to said second fixed pin, a center of curvature of said arcuate slot being at said first fixed pin, and said body of said rack being pivotable about said fixed pin and supported by said second fixed pin while pivoting.

6. The loading drive mechanism according to claim 2, wherein said at least a portion of said driving unit and said driven gear includes a body of said rack, said supporting mechanism includes a pivot support which pivotably supports said body of said rack, and said biasing mechanism includes a plate spring provided on a portion of said disk loading system which resiliently engages said body of said rack, and wherein said plate spring responds to said predetermined amount of force exerted by said driving unit by allowing said body of said rack to pivot away from said predetermined engaging position so that said engaging teeth of said rack and said drive pinion disengage.

7. The loading drive mechanism according to claim 6, wherein said pivot support includes:

a first fixed pin;

a pivot hole formed in said body of said rack and mounted to said first fixed pin;

a second fixed pin; and an arcuate slot formed in said body of said rack and mounted to said second fixed pin, a center of curvature of said arcuate slot being at said first fixed pin, and said body of said rack being pivotable about said first fixed pin and supported by said second fixed pin while pivoting.

8. The loading drive mechanism according to claim 2, wherein said at least a portion of said driving unlit and said driven gear includes a base of said driving unit, said supporting mechanism includes a pivot support which pivotably supports said base, and said biasing mechanism includes a tension spring connecting a stationary portion of said disk drive and said base, and wherein said tension spring responds to said predetermined amount of force exerted by said driving unit by allowing said driving unit to pivot away from said predetermined engaging position so that said engaging teeth of said rack and said drive pinion disengage.

9. The loading drive mechanism according to claim 8, wherein said pivot support includes:

a first fixed pin;

a pivot hole formed in said base of said driving unit and mounted to said first fixed pin;

a second fixed pin; and an arcuate slot formed in said base of said driving unit and mounted to said second fixed pin, a center of curvature of said arcuate slot being at said first fixed pin, and said base of said driving unit being pivotable about said first fixed pin and supported by said second fixed pin while pivoting.

10. The loading drive mechanism according to claim 1, wherein said disk loading system has a transport range, and wherein said predetermined amount of force exerted by said drive unit is reached when said drive unit continues to drive said disk loading system past an end of said transport range.

11. A loading drive mechanism for a disk drive, comprising: a disk loading system that transports a disk within said disk drive;

a motorized driving unit for driving said disk loading system, said motorized driving unit including a drive pinion;

a rack provided to said disk loading system, said rack having engaging teeth engageable to said drive pinion at a predetermined engaging position; and at least one resilient cantilevered portion extending from said rack, said at least one resilient cantilevered portion resiliently supporting said engaging teeth, wherein said at least one resilient cantilevered portion responds to a predetermined amount of force exerted by said driving unit by being deformed, thereby to allow said engaging teeth to move from said predetermined engaging position so that rotation of said drive pinion is not transmitted to said rack.

12. The loading drive mechanism according to claim 11, wherein said at least one resilient cantilevered portion includes two resilient cantilevered portions provided at opposite ends of said rack in a driving direction of said rack.

13. A loading drive mechanism for driving a disk loading system in a disk drive, said loading drive mechanism comprising:

a drive unit including a motor driving a drive pinion;

a driven gear provided to said disk loading system, said driven gear engaging said drive pinion;

a supporting mechanism movably supporting at least a portion of said driven gear to selectively disengage from said drive pinion in response to a predetermined amount of force exerted by said drive unit; and a biasing mechanism biasing said at least a portion of said driven gear to return to engage said drive pinion when said at least a portion of said driven gear is moved away from said drive pinion so that the rotation of the drive pinion is not transmitted to the driven gear.

14. The loading drive mechanism according to claim 13, wherein said driven gear includes a rack.

15. The loading drive mechanism according to claim 14, wherein said supporting mechanism swingably supports said rack on a movable portion of said disk loading system.

16. The loading drive mechanism according to claim 15, wherein said supporting mechanism swingably supports said rack to swing substantially about the longitudinal center of the rack, and wherein said biasing mechanism biases both longitudinal ends of said rack to return to re-engage said drive pinion.

17. The loading drive mechanism according to claim 16, wherein said biasing mechanism includes at least one deformable resilient cantilevered portion extending from a body of said rack and contacting a stopper provided on said movable portion of said disk loading system, and wherein when said at least one resilient cantilevered portion in deformed, said rack swings away from said drive pinion, and is biased by said at least one resilient cantilevered portion to re-engage said drive pinion.

18. The loading drive mechanism according to claim 16, wherein said biasing mechanism includes a deformable resilient plate spring supported by a tab formed on said movable portion of said disk loading system and contacting a body of said rack, and wherein when said resilient plate spring in deformed, said rack swings away from said drive pinion, and is biased by said resilient plate spring to re-engage said drive pinion.

19. The loading drive mechanism according to claim 18, wherein said resilient plate spring contacts and biases both longitudinal ends of said rack.

20. A loading drive mechanism for driving a disk loading system in a disk drive, said loading drive mechanism comprising:

a drive unit including a motor driving a drive pinion;

a driven gear provided to said disk loading system, said driven gear engaging said drive pinion;

a supporting mechanism movably supporting at least a portion of said driven gear to selectively disengage from said drive pinion in response to a predetermined amount of force exerted by said drive unit;

a biasing mechanism biasing said at least a portion of said driven gear to engage said drive pinion when said at least a portion of said driven gear is moved away from said drive pinion;

wherein said driven gear includes a rack, and said rack is fixed to a movable portion of said disk loading system;

wherein said at least a portion of said driven gear includes teeth of said rack, said supporting mechanism includes a body of said rack, and said biasing mechanism includes at least one deformable resilient cantilevered portion extending from said body of said rack and supporting said teeth of said rack; and wherein when said at least one resilient cantilevered portion is deformed, said teeth of said rack disengage from said drive pinion, whereby rotation of said drive pinion is not transmitted to said rack, and said teeth of said rack are biased by said at least one resilient cantilevered portion to re-engage said drive pinion.

21. A loading drive mechanism for driving a disk loading system in a disk drive, said loading drive mechanism comprising:

a drive unit including a motor driving a drive pinion;

a driven gear provided to said disk loading system, said driven gear engaging said drive pinion;

a supporting mechanism movably supporting said drive unit to disengage from said driven gear in response to a predetermined amount of force exerted by said drive unit; and a biasing mechanism biasing said drive unit to re-engage said driven gear when said drive unit disengages from said driven gear.

22. The loading drive mechanism according to claim 21, wherein said driven gear includes a rack fixed to a movable portion of said disk loading system.

23. The loading drive mechanism according to claim 22, wherein said drive unit is swingably mounted on a base to swing toward and away from said rack.

24. The loading drive mechanism according to claim 23, wherein said biasing mechanism includes a tension spring connected to said drive unit.

25. A loading drive mechanism for a disk drive, comprising:

a motorized driving unit for driving a driven gear, said driving unit including a drive pinion;

said driven gear being provided to a disk loading system that transports a disk within said disk drive, said driven gear being engageable to said drive pinion; and a mechanism for disengaging said drive pinion and said driven gear in response to a predetermined amount of force exerted by said driving unit.

26. The loading drive mechanism according to claim 25, wherein said disk loading system has a transport range, and wherein said predetermined amount of force exerted by said drive unit is reached when said drive unit continues to drive said disk loading system past an end of said transport range.

27. A loading drive mechanism for a disk drive, comprising:

a motorized driving unit for driving a driven gear, said driving unit including a drive pinion;

said driven gear being provided to a disk loading system that transports a disk within said disk drive, said driven gear being engageable to said drive pinion; and a mechanism for disengaging at least a portion of one of said driving unit and said driven gear to remove the motive force of said driving unit from said driven gear, in response to a predetermined amount of force exerted by said driving unit.

* * * * *